United States Patent Office.

M. A. GLYNN, OF HAVANA, CUBA.

Letters Patent No. 67,973, dated August 20, 1867.

---

IMPROVED MODE OF TREATING WATER TO PREVENT INCRUSTATIONS IN STEAM-BOILERS.

---

The Schedule referred to in these Letters Patent and making part of the same.

---

TO ALL WHOM IT MAY CONCERN:

Be it known that I, M. A. GLYNN, of Havana, Cuba, have invented a new Process for Treating Water for the Generation of Steam to Prevent the Incrustation of Boilers; and I do hereby declare that the following is a full, clear, and exact description thereof.

This invention relates to an improved process for treating water to be employed for the generation of steam, for the purpose of preventing the incrustation of the boiler.

Take any quantity of the bark of the rhizophera mangle, (red mangrove or mangle, Colorado,) and if, as is to be preferred, it is intended to treat the water before feeding to the steam-generator, the bark should be pulverized; but if it is desired to treat the water in the boiler the bark should be cut into blocks of from six to sixteen cubic inches in volume. Treat the water with the powder in quantities of not less than about twenty-five pounds, nor more than thirty-five pounds to two thousand gallons of water, when a precipitate, generally of a dull gray color, but varying with the character of the water, will be deposited, and the water may now be fed to the boiler, when no incrustation will ensue. Or the blocks of bark may be placed in the boiler and the impure water introduced, when, after some time, a dull gray, muddy precipitate will be deposited, of which the boiler can be cleaned by simply blowing through, but no incrustation will take place. The action of the bark is much accelerated by the addition to the water of chloride of sodium (common salt) in the proportion of one part, by weight, $NaCl$, to about four parts of bark.

I am aware that logwood has been employed for a similar purpose in steam-boilers, but with only partial success, and I have personally conducted and superintended the conduct of numerous experiments with mineral substances and with the bark and wood of various trees, but have not succeeded in producing any decided action, economically advantageous, upon cold water, except with the bark of rhizophera mangle, above specified, until my discovery of the properties whereof there was, owing to the impurities present in the waters employed in the island of Cuba, very slight economy in the use of steam as a source of power in that island.

I claim as new, and desire to secure by Letters Patent—

1. The process of treating water for steam-generaters with bark of the rhizophera mangle, in manner and for the purposes substantially as above described.

2. The process of treating water for steam-generators with said bark of the rhizophera mangle in combination with chloride of sodium, or its equivalent, in the manner and for the purposes substantially as above described.

M. A. GLYNN.

Witnesses:
W. TREWIN,
ALEX. F. ROBERTS.